(12) United States Patent
Mellander

(10) Patent No.: US 10,107,610 B2
(45) Date of Patent: Oct. 23, 2018

(54) ELECTRONIC MICROMETER FOR MEASURING DIMENSIONS OF A BODY AND METHOD OF USING

(71) Applicant: William Elof Mellander, Chesterton, IN (US)

(72) Inventor: William Elof Mellander, Chesterton, IN (US)

(73) Assignee: Susan Jane Harford, Chesterton, IN (US)

( * ) Notice: Subject to any disclaimer, the term of this patent is extended or adjusted under 35 U.S.C. 154(b) by 201 days.

(21) Appl. No.: 15/335,571

(22) Filed: Oct. 27, 2016

(65) Prior Publication Data

US 2017/0122716 A1    May 4, 2017

Related U.S. Application Data

(60) Provisional application No. 62/248,653, filed on Oct. 30, 2015.

(51) Int. Cl.
*G01B 5/20* (2006.01)
*G01B 3/18* (2006.01)
*G01B 7/12* (2006.01)
*G01B 5/08* (2006.01)

(52) U.S. Cl.
CPC ............... *G01B 3/18* (2013.01); *G01B 5/08* (2013.01); *G01B 7/12* (2013.01)

(58) Field of Classification Search
CPC ............. G01B 3/18; G01B 5/08; G01B 7/12
USPC ................... 33/555.1, 551, 552, 553, 554
See application file for complete search history.

(56) References Cited

U.S. PATENT DOCUMENTS

| | | | | |
|---|---|---|---|---|
| 2,863,223 A | * | 12/1958 | Reicherter | G01B 5/08 33/555.1 |
| 3,942,253 A | * | 3/1976 | Gebel | G01B 5/201 33/551 |
| 4,389,788 A | * | 6/1983 | Balogh | G01B 5/08 33/555.1 |
| 5,052,121 A | | 10/1991 | Wachtler | |
| 5,088,207 A | | 2/1992 | Betsill et al. | |
| 5,351,410 A | | 10/1994 | Hainneville | |

(Continued)

OTHER PUBLICATIONS

International Search Report and Written Opinion dated Feb. 8, 2017.

*Primary Examiner* — G. Bradley Bennett
(74) *Attorney, Agent, or Firm* — Hartman Global IP Law; Gary M. Hartman; Domenica N. S. Hartman

(57) ABSTRACT

Methods and equipment suitable for measuring dimensions of a cylindrical body including systems having a housing and means for supporting the housing relative to an arcuate surface of the body. The supporting means comprises at least two wheels having axes of rotation oriented so that engaging the arcuate surface of the body with the two wheels causes edges of the two wheels to contact the arcuate surface at two terminals spaced apart by a length of a chord lying in a cross-section plane of the body. Measurement means is mounted to the housing for contacting a surface point of the body located within the length of the chord of the body, and means is provided for determining the diameter of the body based on the length of the chord determined by the two wheels and a height of the chord ascertained with an output of the measurement means.

17 Claims, 2 Drawing Sheets

(56) References Cited

U.S. PATENT DOCUMENTS

| | | | |
|---|---|---|---|
| 6,047,479 A * | 4/2000 | Galestien | G01B 5/204 |
| | | | 33/546 |
| 6,820,347 B2 | 11/2004 | Mellander | |
| 7,107,696 B2 | 9/2006 | Melander | |
| 2002/0050069 A1* | 5/2002 | Mellander | G01B 5/201 |
| | | | 33/551 |
| 2002/0166248 A1* | 11/2002 | Carr | G01B 11/24 |
| | | | 33/287 |
| 2003/0189713 A1* | 10/2003 | Lam | G01B 11/105 |
| | | | 356/635 |
| 2012/0246956 A1* | 10/2012 | Andersson | G01B 3/20 |
| | | | 33/555.1 |
| 2016/0178341 A1* | 6/2016 | Hieb | G01B 5/10 |
| | | | 33/555.1 |
| 2016/0221142 A1* | 8/2016 | Dall'Aglio | B24B 5/42 |

\* cited by examiner

ELECTRONIC MICROMETER FOR MEASURING DIMENSIONS OF A BODY AND METHOD OF USING

CROSS REFERENCE TO RELATED APPLICATIONS

This application claims the benefit of U.S. Provisional Application No. 62/248,653, filed Oct. 30, 2015, the contents of which are incorporated herein by reference.

BACKGROUND OF THE INVENTION

The present invention generally relates to devices for measuring dimensions of a body. The invention particularly relates to devices for measuring the profile and/or diameter of a cylindrical body, such as a roll used in the production of sheet products.

Cylindrical rolls used to roll sheet products, such as aluminum and paper, are required to have a particular profile in order to obtain a flat rolled product. For this reason, the contours or profiles of such rolls must be accurately measured and variations in diameters along their lengths recorded. Freestanding saddle-type micrometers have been widely used for this purpose.

As represented in U.S. Pat. No. 5,088,207 to Betsill et al., a freestanding saddle micrometer generally includes a saddle supported on wheels for rolling ("skating") along the longitudinal length of a roll. As used herein, the term "freestanding" is used in reference to a saddle-type micrometer in that such micrometers are not mounted to a grinder or other permanent apparatus, but instead are portable and placed on the roll being evaluated. The Betsill et al. saddle micrometer is a caliper-type unit, in that the micrometer has oppositely-disposed arms that extend outward and downward from the saddle so as to be located on opposite sides of a roll when the micrometer is placed on top of a roll. The arms are supported by a rocking crossbar. One of the arms supports a counterweight or follower probe, while the second arm carries an indicator probe, such as a dial indicator or an LVDT (linear variable differential transducer). By locating the follower and indicator probes on their respective arms to be diametrically opposite each other relative to the roll, variations in the diameter of the roll can be detected by skating the saddle along the length of the roll. If a dial indicator is used as the indicator probe, the saddle must make stops along the length of the roll to allow manual recording of the dial indicator reading. If an LVDT or other electronic transducer is used, variations in the roll diameter can be continuously recorded electronically. The saddle is preferably equipped with an encoder to measure the distance skated along the length of the roll, and a minicomputer is mounted on the frame to read, record, and present input data from the LVDT and the encoder.

Saddle micrometers of the type described above have shortcomings that involve compromises in weight, rigidity, balance and operation. In terms of weight and rigidity, such saddle micrometers have taken two approaches: either ignore weight for the sake of rigidity, which results in a unit that operators find difficult to handle but will provide accurate readings, or reduce weight to provide a unit that can be more easily handled but sacrifices rigidity to the extent that imprecise readings may occur. This problem is exacerbated if electronic probes are used, since the unit is constantly in motion as readings are taken. Nonetheless, lighter-weight units are typically more widely accepted because of the difficulty in handling heavier, more rigid units. Such saddle micrometers are also generally top heavy, with the result that the units are more prone to slip off the top of a roll. In the event of slipping off a roll, if a heavier unit is used the unit will probably not be damaged but the operator is at risk of injury. On the other hand, if a lightweight unit slides off a roll, the unit is much more likely to be damaged.

From an operational standpoint, caliper-type micrometers of the type described above do not actually measure roll diameter, but instead are limited to determining the profile of a roll, i.e., variations in diameter along the length of a roll. Furthermore, micrometers have relied on an onboard minicomputer to acquire and process the collected data. Many electronic saddle micrometers are a simple unit that is easy to learn and operate, but provides only basic profile information. More advanced units are available that require extensive training to learn and skill to operate. While providing more detailed profile information, roll history and hard copy printout, in practice such enhanced capabilities were rarely used because of the difficulty in learning how to operate the onboard minicomputer.

From the above, it can be seen that saddle micrometers that overcome the above-noted shortcomings are desirable. An example of such a saddle micrometer is disclosed in U.S. Pat. Nos. 6,820,347 and 7,107,696, the contents of which are incorporated herein by reference. In particular, there is an ongoing desire for micrometers that overcome the above-noted shortcoming comprise relatively compact construction to promote safety and ease of use.

BRIEF DESCRIPTION OF THE INVENTION

The present invention provides method and equipment suitable for measuring dimensions of a body, for example, the diameter and/or profile of a cylindrical body.

According to one aspect of the invention, a freestanding micrometer includes a housing and means for supporting the housing relative to an arcuate surface of a cylindrical body. The supporting means comprises at least two wheels having axes of rotation oriented so that engaging the arcuate surface of the cylindrical body with the two wheels causes edges of the two wheels to contact the arcuate surface at two terminals spaced apart by a length of a chord lying in a cross-section plane of the cylindrical body. Measurement means is mounted to the housing for contacting a surface point of the cylindrical body located within the length of the chord of the cylindrical body, and means is provided for determining the diameter of the cylindrical body based on the length of the chord determined by the two wheels and a height of the chord ascertained with an output of the measurement means.

According to another aspect of the invention, an electronic profile acquisition micrometer system is provided for sensing the diameter and variations in the diameter of a cylindrical body while the cylindrical body is oriented so that its longitudinal axis is approximately horizontal. The micrometer system includes a portable freestanding micrometer unit with a housing having a base and defining an enclosure, means for supporting the housing relative to an arcuate surface of the cylindrical body, and electronic linear measurement means mounted to the housing. The supporting means comprises at least two wheels having axes of rotation oriented so that engaging the arcuate surface of the cylindrical body with the two wheels causes edges of the two wheels to contact the arcuate surface at two terminals spaced apart by a length of a chord lying in a cross-section plane of the cylindrical body. The electronic linear measurement means contacts a surface point of the cylindrical body located within the length of the chord of the cylindrical body. The micrometer system further includes data acquisition means for receiving output signals from the electronic linear measurement means and storing the output signals as data, a computer separate from and outside the housing for receiving the data stored by the data acquisition means and calculating the diameter of the cylindrical body based on the length of the chord determined by the two wheels and a chord distance ascertained with the output signals of the electronic linear measurement means, and means for wirelessly connecting the computer to the data acquisition means for transmitting the data.

Another aspect of the invention is a method of determining the diameter of a cylindrical body by supporting a housing with at least two wheels having axes of rotation oriented so that edges of the two wheels contact an arcuate surface of the cylindrical body at two terminals spaced apart by a length of a chord lying in a cross-section plane of the cylindrical body, determining a chord distance between the chord and a surface point of the cylindrical body located between the two terminals of the chord, and determining the diameter of the cylindrical body based on the length of the chord and the chord distance.

Technical effects of the micrometer, micrometer system, and method described above preferably include the use of a very compact micrometer to perform measurements on a body, for example, the diameter and/or profile of a cylindrical body, instead of just the profile of the body. Because of its compact construction, the micrometer can be constructed to be relatively lightweight, resulting in a unit that is easier and safer to use. In addition, the micrometer of this invention can be constructed to be rigid relative to its weight, resulting in more reliable and precise data acquisition.

Other aspects and advantages of this invention will be better appreciated from the following detailed description.

DETAILED DESCRIPTION OF THE INVENTION

Figure 1:
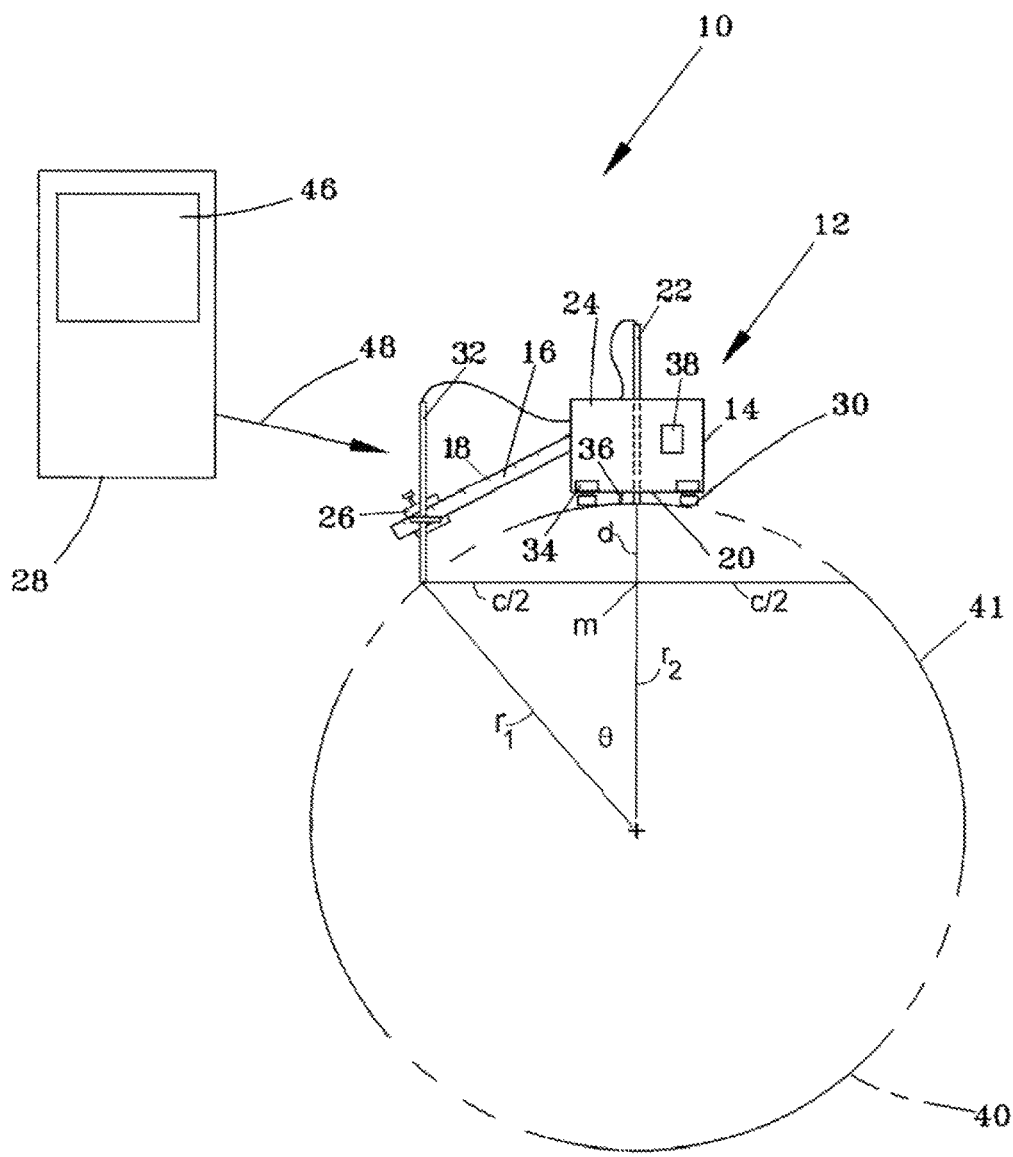
FIGS. 1 and 2 schematically represent embodiments of electronic micrometer systems, wherein each system includes a portable unit which is shown placed on a cylindrical body for sensing the diameter and diametrical variations of the body.

An electronic micrometer system 10 in accordance with a nonlimiting first embodiment of the invention is shown in FIG. 1. The system 10 can be seen to comprise a portable unit 12 that includes a housing 14, an arm 16 extending from the housing 14, and a remote computer 28 such as a personal computer (PC) or other processing apparatus. As seen in FIG. 1, the housing 14 has a base 20 and cover 24 that generally define an enclosure. The base 20 and cover 24 may be constructed of various materials, including but not limited to aluminum or other relatively lightweight but rigid structural materials. The housing 14 is capable of being very compact, for example, lateral and longitudinal dimensions of about twelve inches (about 30 cm) or less, with a weight of about twelve pounds (about 5.5 kg) or less.

The base 20 is preferably equipped with means for supporting the housing 14 on an arcuate surface 41 of a cylindrical roll 40, as depicted in FIG. 1. To enable the unit 12 to skate the roll 40 in order to measure variations in the diameter (i.e., profile) of the roll 40 along its length, the means of support preferably comprises at least two wheels 30, as schematically represented in FIG. 1. The wheels 30 are shown as being rotatably supported by bearings 34 so that the axis of rotation of each wheel 30 is substantially perpendicular to the base 20 of the housing 14, and vertical to earth when the housing 14 is supported by the wheels 30 on top of an arcuate surface, for example, the surface 41. As seen in FIG. 1, this orientation results in an inward-facing edge of each wheel 30 contacting the arcuate surface 41 and allows for the use of wheels 30 of small diameter that are capable of more positively positioning the housing 14 on the surface 41 of the roll 40 and therefore promotes the accuracy of the unit 12. As depicted, the diameters of the wheels 30 are smaller than the diameters of the bearings 34 supporting them. The housing 14 is preferably equipped with means for measuring the distance traveled by the housing 14 along the axial direction of the roll 40. For example, such a means may comprise an encoder (not shown) adapted to measure the distance traveled by the housing 14 by sensing rotation of one or more of the wheels 30. The housing 14, arm 16 and wheels 30 are preferably configured to allow the unit 12 to be used for a wide range of roll diameters.

The housing 14 is also shown as having a sensing element 22 mounted thereto for sensing the surface 41 of the roll 40 beneath the housing 14 and between the two wheels 30 visible in FIG. 1. While shown as extending through the body of the housing 14, the sensing element 22 could be mounted externally to the housing 14. Suitable devices for the sensing element 22 include electronic linear measurement devices, such as an LVDT, which generate an electronic signal that accurately indicates displacement of a surface relative to the housing 14. The sensing element 22 is preferably oriented to be aligned with a radius of the roll 40, e.g., vertical when the housing 14 is positioned top-dead-center on the roll 40, as is represented in FIG. 1.

The arm 16 is shown as extending from one side of the housing 14, generally in a lateral and downward direction at an acute angle to the base 20 of the housing 14. The arm 16 includes graduations 18 along its length, and a second sensing element 32 is adjustably mounted to the arm 16 with a bracket 26. As with the sensing element 22, a suitable device for the sensing element 32 mounted to the arm 16 is an LVDT or other electronic linear measurement device. The graduations 18 on the arm 16 enable the sensing element 32 to be precisely positioned relative to the housing 14, and therefore the sensing element 22. As seen in FIG. 1, the sensing elements 22 and 32 are preferably oriented to be substantially parallel to each other, so that they come into contact with surface points of the roll 40 as a result of being displaced in parallel directions, e.g., vertical as shown in FIG. 1. Furthermore, the sensing elements 22 and 32 are not positioned diametrically opposite each other relative to the roll 40. As represented in FIG. 1, the sensing element 22 is located at or near top-dead-center of the roll 40 while the sensing element 32 locates one terminal of a chord of the roll 40, represented in FIG. 1 as the sum of two half-chords, each having a length of c/2. Because of the location of the sensing element 22 on the roll 40, the sensing element 22 (and the surface point it locates) is aligned with the midpoint (m) of the chord.

As evident from FIG. 1, the sensing elements 22 and 32 are adapted to make contact with points (or close approximations thereof) on the surface 41 of the roll 40 that are circumferentially spaced-apart. The surface points contacted by the elements 22 and 32 are geometrically related by the lengths of the chord and a radius ($r_1$) that each intersect the surface point contacted by the sensing element 32, a radius ($r_2$) that either intersects or is axially aligned with the surface point contacted by the sensing element 22, and an angle θ defined between the radii $r_1$, and $r_2$, as seen in FIG. 1. A portion of the length of the radius $r_2$ lies between the chord and the surface point contacted by the sensing element 22, and is defined herein as a chord distance (d). Accordingly, the remaining portion of the radius $r_2$ (between the chord and a center or an axis of rotation (a) of the roll 40) has a length $r_2$–d. Based on the geometric relationship between the chord half-length (c/2) and chord distance (d), the diameter of the roll 40 can be computed with the formula $$D=(c^2+4d^2)/4d$$

where D is the diameter of the cylindrical body.

The chord distance, d, is able to be effectively measured with the sensing elements 22 and 32 as a result of the sensing elements 22 and 32 simultaneously moving in a parallel direction to their respective contact surface points. For this purpose, the two sensing elements 22 and 32 are calibrated relative to each other with regard to their positions and measurement ranges. The chord length c is twice the distance c/2, and therefore twice the lateral (horizontal) distance between the sensing elements 22 and 32. For this purpose, the chord half-length is physically established by accurately positioning the sensing element 32 along the length of the arm 16 with the graduations 18. The graduations 18 effectively serve as a chord scale that projects out over a circumferential portion of the roll 40 adjacent the housing 14. The graduations 18 define stops at which the movable sensing element 32 can be accurately located relative to the sensing element 22. As such, the unit 12 is able to establish multiple chord lengths, such that a chord length can be established that, based on the size of the roll 40 being evaluated, will provide a measurable distance sufficient to accurately calculate the roll diameter, preferably with an accuracy having a range of about 0.015 inch (about 0.4 mm) or less, without the need for diametrically-opposed sensors. As depicted in FIG. 1, the accuracy of the unit 12 can be enhanced by including a temperature probe 36 for sensing the temperature of the roll 40 in the vicinity of the surface measurements made by the sensing elements 22 and 32 to compensate for thermal expansion resulting from temperature variations. Such a capability is particular advantageous if the roll 40 is at an elevated temperature as a result of the rolling process in which it is used.

In view of the above, it can be seen that the portable unit 12, comprising the housing 14 and arm 16, is capable of having a rigid, compact and relatively lightweight construction. The unit 12 therefore can have a low profile and center of gravity, which equates to better balance when the unit 12 is in use, and therefore improved safety for the unit 12 and its operator. The rigidity of the housing 14 promotes the stiffness of the entire unit 12, such that the unit 12 has the mechanical integrity to support state-of-the-art electronics. As the unit 12 skates the roll 40 in the direction of its longitudinal axis, there is minimal extraneous mechanical motion to distort the electronic readings produced by the sensing elements 22 and 32.

The housing 14 is also capable of serving as an enclosure for data acquisition hardware 38 and a suitable power supply, such as a battery (not shown). FIG. 1 schematically represents the micrometer system 10 as including the computer 28, which is separate from and outside the housing 14. The computer 28 preferably utilizes dedicated software to process data stored by the data acquisition hardware 38 carried by the housing 14, and is preferably capable of representing the data on a screen 46. Any suitable communication device 48 can be used to connect the computer 28 to the data acquisition hardware 38 for transferring the data. In one nonlimiting embodiment, the device 48 is a cable, while in another nonlimiting embodiment the device 48 is a wireless module that allows data from the unit 12 to be transmitted to a remote location, such as where the computer 28 is a central terminal anywhere within the complex in which the measurements are being performed. According to another preferred aspect of the invention, the computer 28 is provided with touch screen icon-activated functions that are software-driven to receive and display pertinent data quickly, simply, and in a user-friendly format. The touchscreen computer 28 makes available to the operator an onscreen display of a roll profile skate, that is, a profile based on the measurements of a roll, which can be projected over a target profile so the operator can see if a roll is within specifications.

Figure 2:
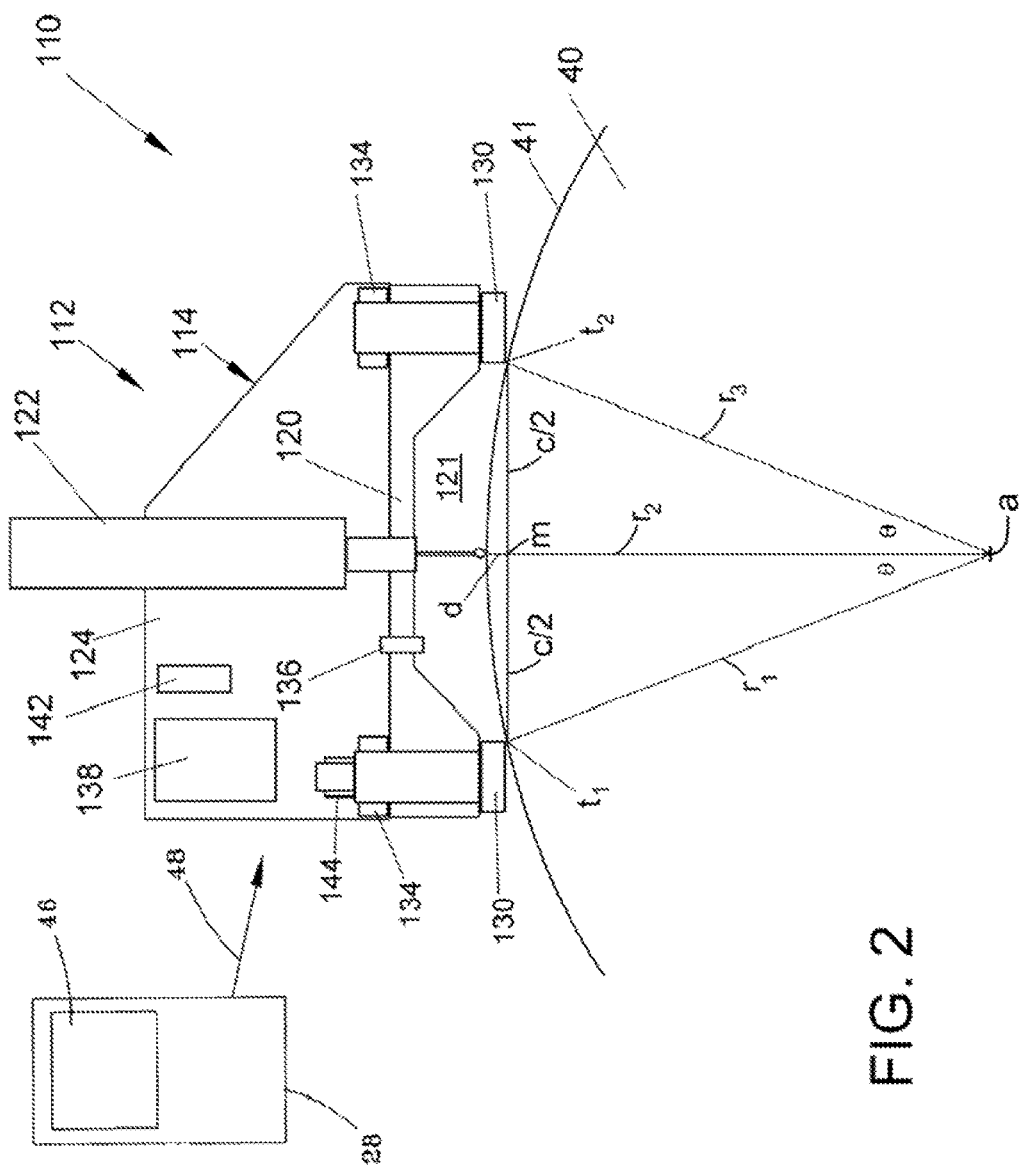

An electronic micrometer system 110 in accordance with another nonlimiting embodiment of the invention is shown in FIG. 2. In FIG. 2, consistent reference numbers are used to identify the same or functionally equivalent elements, but with a numerical prefix (1) added to distinguish the embodiment from the embodiment of FIG. 1. In view of similarities between the embodiments of FIGS. 1 and 2, the following discussion of FIG. 2 will focus primarily on aspects of the second embodiment that differ from the first embodiment in some notable or significant manner. Other aspects of the second embodiment not discussed in any detail can be, in terms of structure, function, materials, etc., essentially as was described for the first embodiment.

The system 110 of FIG. 2 can be seen to comprise a portable unit 112 that includes a housing 114 and a remote computer 28 such as a personal computer (PC) or other processing apparatus, but lacks the arm 16 and sensing element 32 of FIG. 1. As seen in FIG. 2, the housing 114 has a base 120 and cover 124 that generally define an enclosure that is preferably very compact, for example, outer dimensions of about twelve inches (about 30 cm) or less and a weight of about twelve pounds (about 5.5 kg) or less. The base 120 is equipped with means for supporting the housing 114 on an arcuate surface 41 of a cylindrical roll 40, preferably including two wheels 130 that are schematically represented in FIG. 2. The housing 114 preferably comprises at least a second pair of wheels (not shown) that are located immediately behind the wheels 130 as viewed in FIG. 2. As with the embodiment of FIG. 1, the wheels 130 are rotatably supported by bearings 134 so that the axis of rotation of each wheel 130 is substantially perpendicular to the base 120 of the housing 114 and an edge of each wheel 130 contacts the arcuate surface 41 of the roll 40. The housing 114 is preferably equipped with means for measuring the distance traveled by the housing 14 along the axial direction of the roll 40. For example, such a means may comprise an encoder 144 adapted to measure the distance traveled by the housing 114 by sensing rotation of one (or more) of the wheels 130. The housing 114 also preferably encloses data acquisition hardware 138 and a suitable power supply, such as a battery 142.

The housing 114 has a sensing element 122, such as an LVDT, for sensing a linear distance to the surface 41 of the roll 40 beneath the housing 114 relative to the housing 114. To provide ample space for the sensing element 122 between the base 20 and roll surface 41 beneath the housing 114, the base 120 preferably defines a cavity 121 between the two wheels 130. The sensing element 122 is shown as extending into the cavity 121 and oriented to coincide with or be axially aligned with a radius, $r_2$, of the roll 40, e.g., a vertical radius when the housing 114 is positioned on the roll 14 so that the element 122 is top-dead-center on the roll 40. By locating the sensing element 122 precisely midway between the inner lower edges of the wheels 130 as represented in FIG. 2, the sensing element 122 is located at or axially aligned with a midpoint, m, of a chord of the roll 40 whose terminals $t_1$ and $t_2$ are defined by the two wheels 130, which are laterally spaced apart from the sensing element 122 such that their lower inner edges contact the roll surface 41 and locate the two terminals, $t_1$ and $t_2$, of the chord, and so that the terminals $t_1$ and $t_2$ define with the chord midpoint, m, two half-chords each having a length of c/2.

As evident from FIG. 2, the sensing element 122 and wheels 130 are adapted to make contact at points (or approximations thereof) on the surface 41 of the roll 40 that are circumferential spaced-apart. The surface points (terminals $t_1, t_2$) contacted by the wheels 130 preferably lie in the same cross-sectional plane of the roll 40, and the surface point contacted by the sensing element 122 may also lie in the same cross-sectional plane or be axially offset from this plane. As seen in FIG. 2, the surface points contacted by the sensing element 122 and each wheel 130 are geometrically related by the chord length c, a radius $r_1$ that intersects the terminal $t_1$ of the chord, the radius $r_2$, and a third radius $r_3$ that intersects the terminal $t_2$ of the chord. With the radius $r_2$, the radii $r_1$ and $r_3$ define a pair of angles θ, which may be equal if the surface point contacted by the sensing element 122 is aligned with the midpoint m of the chord. A chord distance, d, lies between the chord and the surface point contacted by the sensing element 122 located between the two terminals $t_1$ and $t_2$ of the chord. The diameter of the roll 40 can again be computed with the formula $$D=(c^2+4d^2)/4d$$

where D is the diameter of the cylindrical body.

The chord distance is a determinable value based on the output of the sensing element 122 and known spacial relationships between the location of the sensing element 122 and each wheel 130, which remain constant as the sensing element 122 and wheels 130 move in a parallel direction while contacting the surface 41 of the roll 40. The chord length c is the distance between the inner lower edges of the two wheels 130, which is also a known spacial relationship determined by the construction of the base 120 and the size of the wheels 130. The chord length c and measurable chord distance d are sufficient to accurately calculate the roll diameter, e.g., with an accuracy having a range of about 0.015 inch (about 0.4 mm) or less, without the need for a second sensor. The accuracy of the unit 112 can be enhanced by including a temperature probe 136 for sensing the temperature of the roll 40 in the vicinity of the surface measurements made by the sensing element 122 to compensate for thermal expansion resulting from temperature variations.

As a result of the elimination of the arm 16 of FIG. 1, the portable unit 112 of FIG. 2 is more compact than the unit 12 of FIG. 1, while also being capable of having a rigid, compact and relatively lighter construction. The unit 112 is therefore capable of having a center of gravity that can be more closely aligned with the center of the roll 40, which equates to better balance of the unit 112 and improved safety for the operator.

In view of the above, the electronic micrometer systems 10 and 110 provide many capabilities and advantages lacking in prior art caliper-type saddle micrometers. The portable units 12 and 112 are able to accurately measure the diameter of a cylindrical body without the use of diametrically-opposed probes, such that the units 12 and 112 are relatively compact and lightweight. In addition, the housings 14 and 114 of the units 12 and 112 provide very rigid, low profile structures with low centers of gravity, improving the balance and handling of the portable units 12 and 112.

With the computing power of the computer 28, the options for the manipulation and presentation of data become essentially unlimited. Total roll management, including profiling, evaluation, history and inventory, also becomes practical with this invention. The data acquired can be set for different levels of access controlled by passwords (e.g., operator and management). The storage medium of the computer 28 can be readily sized to allow for individual user requirements and subsequent system refinements and upgrades. With the use of a wireless module as the communication device 48, data from multiple units 12/112 can be transmitted to a central terminal (of which the computer 28 is a component), where rolls can be evaluated at the corporate, plant site, roll shop, operator and/or grinder level. The inventory and life expectancy of rolls can be monitored, and the history of each roll tracked from the day it is put into service until the end of its useful life.

While the invention has been described in terms of specific or particular embodiments, it should be apparent that alternatives could be adopted by one skilled in the art. For example, the electronic micrometer systems 10 and 110 and their components could differ in appearance and construction from the embodiments described herein and shown in the drawings, functions of certain components of the systems 10 and 110 could be performed by components of different construction but capable of a similar (though not necessarily equivalent) function, and various materials could be used in the fabrication of the systems 10 and 110 and/or their components. In addition, the invention encompasses additional or alternative embodiments in which one or more features or aspects of different disclosed embodiments may be combined. Accordingly, it should be understood that the invention is not necessarily limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A freestanding micrometer for measuring dimensions of a cylindrical body, the freestanding micrometer comprising:

a housing;

means for supporting the housing relative to an arcuate surface of the cylindrical body, the supporting means comprising at least two wheels having axes of rotation oriented so that engaging the arcuate surface of the cylindrical body with the two wheels causes edges of the two wheels to contact the arcuate surface at two terminals spaced apart by a length of a chord lying in a cross-section plane of the cylindrical body;

measurement means mounted to the housing for contacting a surface point of the cylindrical body located within the length of the chord of the cylindrical body; and means for determining the diameter of the cylindrical body based on the length of the chord determined by the two wheels and a chord distance to the chord ascertained with an output of the measurement means.

2. The freestanding micrometer according to claim 1, wherein the determining means is programmed to calculate the diameter of the cylindrical body based on the formula $$D=(c^2+4d^2)/4d$$

where d is the diameter of the cylindrical body, c is the length of the chord, and d is the chord distance.

3. The freestanding micrometer according to claim 1, wherein the determining means comprises:
   a computer outside the housing for calculating the diameter of the cylindrical body; and
   means for transmitting the output of the measurement means to the computer.

4. The freestanding micrometer according to claim 1, wherein the support means enables the freestanding micrometer to travel along a longitudinal length of the cylindrical body.

5. The freestanding micrometer according to claim 4, further comprising means for sensing a distance the freestanding micrometer travels along the longitudinal length of the cylindrical body.

6. The freestanding micrometer according to claim 5, further comprising means for determining a profile of the cylindrical body along the longitudinal length thereof based on changes in the diameter of the cylindrical body determined at different locations along the longitudinal length of the cylindrical body.

7. An electronic profile acquisition micrometer system for sensing the diameter and variations in the diameter of a cylindrical body while the cylindrical body is oriented so that its longitudinal axis is approximately horizontal, the micrometer system comprising:
   a portable freestanding micrometer unit comprising:
      a housing having a base and defining an enclosure;
      means for supporting the housing relative to an arcuate surface of the cylindrical body, the supporting means comprising at least two wheels having axes of rotation oriented so that engaging the arcuate surface of the cylindrical body with the two wheels causes edges of the two wheels to contact the arcuate surface at two terminals spaced apart by a length of a chord lying in a cross-section plane of the cylindrical body;
      electronic linear measurement means mounted to the housing for contacting a surface point of the cylindrical body located within the length of the chord of the cylindrical body; and
   data acquisition means for receiving output signals from the electronic linear measurement means and storing the output signals as data;
   a computer separate from and outside the housing for receiving the data stored by the data acquisition means and calculating the diameter of the cylindrical body based on the length of the chord determined by the two wheels and a chord distance ascertained with the output signals of the electronic linear measurement means; and
   means for wirelessly connecting the computer to the data acquisition means for transmitting the data.

8. The electronic profile acquisition micrometer system according to claim 7, wherein the computer is programmed to calculate the diameter of the cylindrical body based on the formula $$D=(c^2+4d^2)/4d$$

where D is the diameter of the cylindrical body, c is the length of the horizontal chord, and d is the chord distance.

9. The electronic profile acquisition micrometer system according to claim 7, further comprising means for sensing a distance the housing travels along a longitudinal length of the cylindrical body.

10. The electronic profile acquisition micrometer system according to claim 9, further comprising means for determining a profile of the cylindrical body along the longitudinal length thereof based on changes in the diameter of the cylindrical body continuously determined along the longitudinal length of the cylindrical body.

11. The electronic profile acquisition micrometer system according to claim 7, further comprising means for sensing a temperature of the cylindrical body adjacent the housing.

12. A method of determining the diameter of a cylindrical body, the method comprising the steps of:
   supporting a housing relative to an arcuate surface of the cylindrical body, the housing being supported by at least two wheels having axes of rotation oriented so that edges of the two wheels contact the arcuate surface at two terminals spaced apart by a length of a chord lying in a cross-section plane of the cylindrical body;
   determining a chord distance between the chord and a surface point of the cylindrical body located between the two terminals of the chord; and
   determining the diameter of the cylindrical body based on the length of the chord and the chord distance.

13. The method according to claim 12, wherein the surface point locates the midpoint of the length of the chord.

14. The method according to claim 12, wherein the diameter is determined with a computer program that calculates the diameter of the cylindrical body based on the formula $$D=(c^2+4d^2)/4d$$

where D is the diameter of the cylindrical body, c is the length of the chord, and d is the chord distance.

15. The method according to claim 12, wherein the output signals are transmitted from the housing to a computer outside the housing, and the computer calculates the diameter of the cylindrical body.

16. The method according to claim 12, further comprising the steps of:
   causing the housing to travel along a longitudinal length of the cylindrical body;
   sensing a distance the housing travels along the longitudinal length of the cylindrical body; and
   determining a profile of the cylindrical body along the longitudinal length thereof based on changes in the diameter of the cylindrical body determined at different locations along the longitudinal length.

17. The method according to claim 12, further comprising the step of sensing a temperature of the cylindrical body.

\* \* \* \* \*